United States Patent Office 3,195,547
Patented July 20, 1965

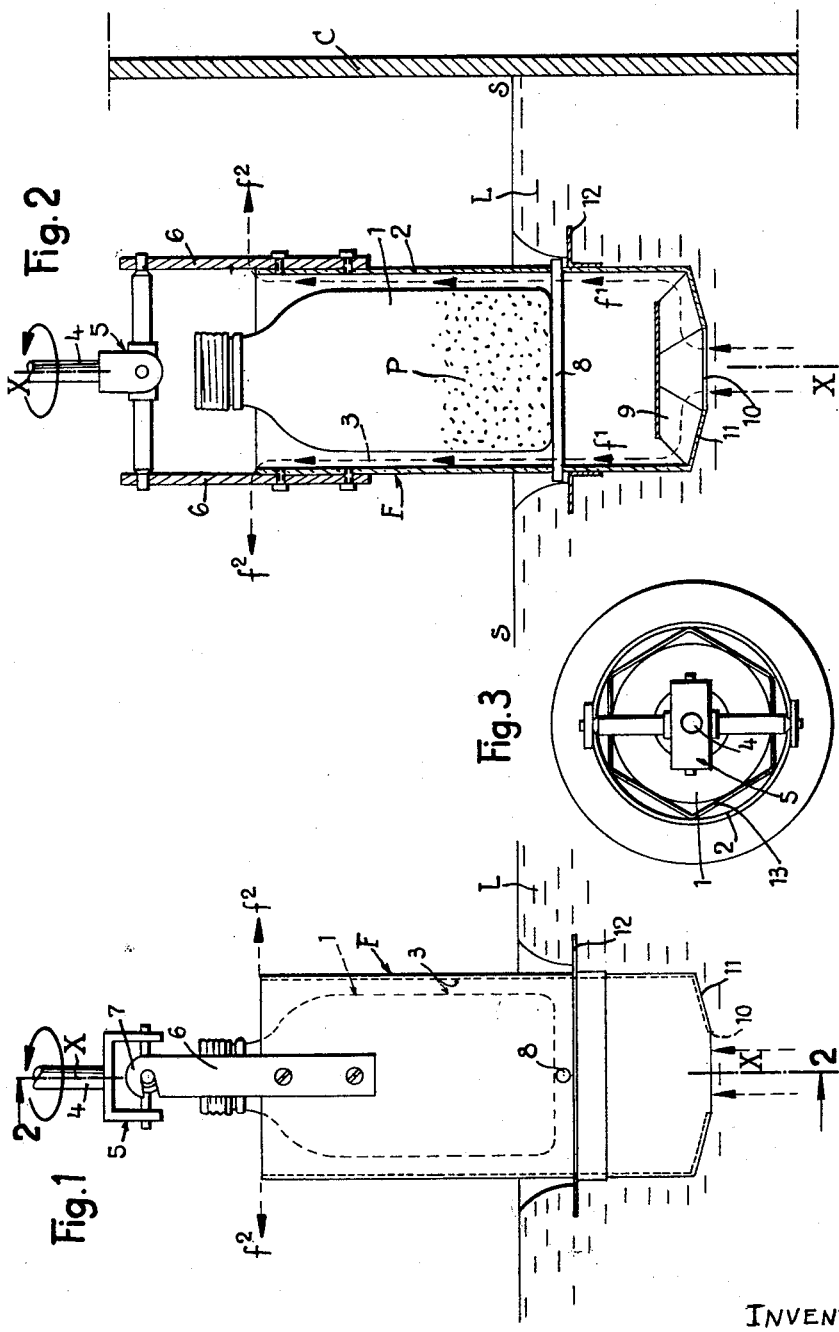

3,195,547
DEVICE FOR THE FREEZING OF A PRODUCT TO BE LYOPHILIZED AND OTHER PRODUCTS
Louis Marie Antoine Rieutord, Paris, France, assignor to Societe d'Utilisation Scientifique et Industrielle du Froid Usifroid, Boulogne-sur-Seine, Seine, France, a corporation of France
Filed July 24, 1963, Ser. No. 297,301
Claims priority, application France, Oct. 23, 1962, 913,189, Patent 1,345,073
6 Claims. (Cl. 134—163)

The present invention relates to the freezing of products and more particularly products intended to be lyophilized or freeze dried in bottles of rather large volume. The freezing of such products is usually carried out in the form of a "shell," that is, in distributing as evenly as possible over the entire extent of the inner surface of the walls of the bottle an amount of product which is less than the total volume of this bottle. The object of this distribution is to reduce the thickness of the layer of frozen product, since the duration of the lyophilization or freeze drying operations depends on this thickness.

The various known processes for obtaining this "shell" freezing are based on two general principles: the first principle consists in slowly rotating the bottle about its axis which is horizontal or slightly inclined, and the second consists in rapidly rotating the bottle about its axis which is vertical. In the second case, it is centrifugal force which distributes the product over the inner cylindrical surface of the bottle.

In both cases, the bottle is highly cooled either by partial immersion in a refrigerated bath or by the spraying of the wall of the bottle with jets of refrigerating liquid.

In all these known processes the freezing operation is relatively slow and the evenness of the distribution of the frozen mass is sometimes unsatisfactory.

The object of the invention is to remedy these drawbacks.

An object of the invention is therefore to provide an improved process and device for freezing in bottles or other containers products intended to be lyophilized or other products which permit a rapid freezing and produce high evenness in the distribution of frozen mass.

The process according to the invention, which is of the type in which the bottle or other container containing the product to be frozen undergoes a rotational motion about its vertical axis, comprises driving in rotation a sleeve surrounding the bottle which it supports and with which it is coaxial and concentric, an even annular space being formed between the sleeve and bottle, and so utilizing this rotation of the sleeve as to automatically create a rising current of a refrigerating liquid in said space around the bottle.

The freezing device for carrying out said process comprises in combination with the bottle or other cylindrical container containing the product to be frozen, a cylindrical sleeve having an inside diameter exceeding the outside diameter of the bottle; said sleeve being adapted to be partially immersed in a refrigerating liquid and having, at its upper part means for driving it in rotation about its vertical axis at a point intermediate its upper and lower ends, inner support means for coaxially supporting the bottle without closing said annular space formed between the bottle and the sleeve and driving said bottle in rotation; and, at its lower part, a pumping device for producing as a result of the rotation of the sleeve a circulation of the refrigerating liquid in said annular space.

Further features and advantages of the invention will be apparent from the ensuing description, with reference to the accompanying drawing to which the invention is in no way limited.

In the drawing:
FIG. 1 is an elevational view of the device according to the invention;
FIG. 2 is a longitudinal sectional view taken along line 2—2 of FIG. 1, and
FIG. 3 is a plan view thereof.

In the illustrated embodiment, the device comprises, in combination with a cylindrical bottle or jar 1 containing the product P to be frozen (this product being shown at rest in FIG. 2), a sleeve generally designated by the reference character F.

This sleeve comprises a cylindrical tubular body 2 having an inside diameter exceeding the outside diameter of the bottle 1, so that when this bottle is centered on the axis X—X of the sleeve there is provided between the bottle and sleeve a longitudinal passageway 3 having a regular annular cross-section.

The sleeve F comprises, at its upper part, means for suspending and rotating the sleeve about the axis X—X; these means comprise a suspension and driving spindle 4 coaxial with the sleeve and connected by a universal joint 5 or other joint to the tubular body 2 on which are secured, for example, two diametrally opposed strips 6 which terminate in hooks 7 for hooking on said joint 5; at a point intermediate the upper and lower ends of the sleeve but toward its lower end, a diametral rod 8 adapted to support the bottle 1 without obstructing the annular passage 3; at its base, a bladed wheel 9 similar to a centrifugal pump impeller adapted to pump through a central opening 10 of a bottom 11 a part of the refrigerating liquid of a liquid bath L in which the device is immersed so as to discharge this liquid upwardly in the direction of the arrows $f^1$ through the passageway 3 (FIG. 2); and lastly, on the outside, a deflecting flange 12 located at such level that it would be immersed in the liquid bath L. The function of this flange will be explained hereinafter.

To carry out the process of the invention, the bottle containing the product P is placed vertically in the support 2 so that the axis of the bottle coincides with the axis X—X of the support. The centering of the bottle can be insured, for example, by means of a spring strip in the shape of a polygonal ring 13 (FIG. 3).

The support 2 is then driven in rotation by the spindle 4 which can be driven by a motor either directly or through the medium of belts or some other transmission. The bottle 1 and its contents P (shown in its position before rotation in FIG. 2) naturally participate in this rotation.

As the base of the cylindrical support is immersed in the bath of refrigerating liquid L, the bladed wheel 9 sucks in liquid from said bath and discharges it through the annular space 3 in the form of an annular liquid stream flowing at high speed in the upward direction (see arrows $f^1$ in FIG. 2) in the space formed between the coaxial walls of the bottle and sleeve. This results in an intense and rapid cooling of the bottle and its contents P which are centrifuged against the inner surface of the wall of this bottle.

The refrigerating liquid rises up to the upper edge of the support 2 where it is thrown outwardly in the direction of arrows $f^2$ by the centrifugal force in the form of a horizontal sheet of liquid and thereafter falls back into the liquid bath L after running down the walls of the tank C containing this bath.

Tests have shown that the main difficulty to overcome is the instability of the support 2 which, as soon as it is driven in rotation, has a tendency to undergo a conical pendular motion of increasing amplitude owing to the hydrodynamic reactions of the liquid of the bath L, the deviations of the liquid currents caused by the walls of the tank C, and cavitation phenomena resulting from the high rotational speed, the latter effect being predominant.

Stabilization is achieved in placing around the cylindrical wall of the support 2 below the upper surface S—S of the bath, a flange 12 which eliminates the cavitation phenomena and damps the conical pendular oscillations as soon as the latter have a tendency to start up.

By way of example, a device according to the invention used with a bottle having a volume of 500 cc. and containing 350 cc. of blood plasma permitted freezing within 15 minutes, the temperature of the refrigerating bath (commercial alcohol) being about −40° C. With a rotational speed of 1,000 r.p.m., the shape of the frozen "shell" was perfectly even and the central aperture had a hardly noticeable conicity.

Although a specific embodiment of the invention has been described, many modifications and changes may be made therein without departing from the scope of the invention as defined in the appended claims.

The centrifugal pump wheel placed at the base of the support 2 can be replaced by a wheel having helical blades of the helical pump type or by any other pumping means.

Having now described my invention what I claim as new and desire to secure by Letters Patent is:

1. Apparatus for freezing a liquid in a container, comprising an upright sleeve for immersion in a cooling liquid, means above the sleeve for rotating the sleeve about an upright axis with the sleeve encompassing said axis, means for supporting a container in the sleeve, and pump means comprising at least one projection on the lower part of the sleeve for forcing said cooling liquid upwardly within the sleeve upon rotation of the sleeve.

2. Apparatus as claimed in claim 1, and universal joint means for suspending the sleeve from said means for rotating the sleeve.

3. Apparatus as claimed in claim 2, said axis passing through the center of gravity of what is suspended from said universal joint means.

4. Apparatus as claimed in claim 1, said pump means comprising a plurality of blades in unitary assembly with a lower portion of the sleeve.

5. Apparatus as claimed in claim 1, and a horizontal outwardly extending annular flange carried by the exterior of the sleeve for stabilizing the sleeve when the sleeve is immersed in a liquid and rotated.

6. Apparatus as claimed in claim 1, and means carried by the sleeve for urging a container toward the center of the sleeve.

References Cited by the Examiner

UNITED STATES PATENTS

| | | | |
|---|---|---|---|
| 2,373,806 | 4/45 | Barnes et al. | 62—345 |
| 2,379,932 | 7/45 | Schoepflin et al. | 239—219 X |
| 2,655,007 | 10/53 | Lazar | 62—375 X |
| 2,685,177 | 8/54 | Wagner | 62—345 |

ROBERT A. O'LEARY, *Primary Examiner.*